United States Patent
Bono et al.

(10) Patent No.: US 10,831,609 B2
(45) Date of Patent: Nov. 10, 2020

(54) DATA STORAGE SYSTEM WITH LUN SNAPSHOT SHIPPING USING VOLUME-TO-OBJECT TRANSLATION

(71) Applicant: EMC IP Holding Company LLC, Hopkinton, MA (US)

(72) Inventors: Jean-Pierre Bono, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 266 days.

(21) Appl. No.: 15/966,343

(22) Filed: Apr. 30, 2018

(65) Prior Publication Data

US 2019/0332488 A1 Oct. 31, 2019

(51) Int. Cl.
*G06F 11/00* (2006.01)
*G06F 11/14* (2006.01)
*H04L 29/08* (2006.01)

(52) U.S. Cl.
CPC ...... *G06F 11/1451* (2013.01); *H04L 67/1097* (2013.01); *G06F 2201/80* (2013.01); *G06F 2201/84* (2013.01)

(58) Field of Classification Search
CPC . H04L 67/1097; H04L 67/1095; H04L 63/10; G06F 16/275; G06F 21/6236; G06F 3/062; G06F 11/1451; G06F 2201/84; G06F 11/1446; G06F 11/2058; G06F 11/2064; G06F 11/2082; G06F 3/065; G06F 16/128; G06F 16/184; G06F 2201/80
See application file for complete search history.

(56) References Cited

U.S. PATENT DOCUMENTS

| | | | |
|---|---|---|---|
| 8,650,359 B2 | 2/2014 | Vaghani et al. | |
| 9,208,181 B2 | 12/2015 | Pandey et al. | |
| 9,372,809 B2 | 6/2016 | Testardi et al. | |
| 10,042,710 B2* | 8/2018 | Mutalik | G06F 3/067 |
| 2012/0089781 A1 | 4/2012 | Ranade et al. | |
| 2015/0227602 A1* | 8/2015 | Ramu | G06F 16/2365 |
| | | | 707/634 |
| 2016/0004721 A1* | 1/2016 | Iyer | G06F 16/128 |
| | | | 707/649 |
| 2016/0034481 A1* | 2/2016 | Kumarasamy | G06F 16/128 |
| | | | 707/639 |

(Continued)

*Primary Examiner* — Merilyn P Nguyen
(74) *Attorney, Agent, or Firm* — BainwoodHuang

(57) ABSTRACT

Shipping local snapshots of logical units of data storage (LUNs) to cloud storage, wherein the local snapshots reside on local physical storage of a data storage system, includes replicating a baseline local snapshot of a LUN to a cloud-backed LUN backed by cloud physical storage of cloud storage system, and taking a first snapshot of the cloud-backed LUN to establish a baseline cloud-backed snapshot. For a subsequent local snapshot of the LUN, the method (1) identifies data content differences between the subsequent local snapshot and the baseline local snapshot, (2) updates the cloud-backed LUN by applying the data content differences, and (3) takes a second snapshot of the cloud-backed LUN, the second snapshot being a cloud-backed copy of the subsequent local snapshot and containing, in the cloud physical storage, (a) first blocks unique to the second snapshot and (b) second blocks shared with the baseline cloud-backed snapshot.

20 Claims, 5 Drawing Sheets

(56) References Cited

U.S. PATENT DOCUMENTS

2017/0249222 A1\* 8/2017 Patnaik ............... G06F 11/1446
2017/0318089 A1\* 11/2017 Pandit ................. H04L 67/1095
2018/0121453 A1\* 5/2018 Jain ..................... G06F 11/1448
2018/0121454 A1\* 5/2018 Kushwah ............. G06F 12/121

\* cited by examiner

DATA STORAGE SYSTEM WITH LUN SNAPSHOT SHIPPING USING VOLUME-TO-OBJECT TRANSLATION

BACKGROUND

The present invention relates to the field of data storage systems used for secondary storage of data in computer systems. More particularly, it relates to data storage systems using cloud-based storage for storing data of locally defined storage elements such as logical units (LUNs).

SUMMARY

In modern computer systems it can be desirable to use data storage services available from so-called "cloud" providers, whose economies of scale help them provide very cost-effective and reliable remote data storage. The present disclosure is directed to a technique that stores certain data to "the cloud" (i.e., a remote storage system having a general-purpose, object-focused interface) using certain procedures, along with the ability to restore data from the cloud back to local storage. More particular, it is directed to cloud-based replication or backup of so-called "snapshots", which are point-in-time copies of in-use, production storage units called logical units or "LUNs". Such replication or backup of snapshots is referred to as "snapshot shipping" herein.

Advantages of the disclosed technique include some or all of the following:

1. Provides a LUN abstraction to access the snapshots that have been shipped to the cloud. This avoids the need to re-create local snapshots by importing a baseline and incremental backups, which is complicated and time-consuming.

2. It avoids the need for a "synthetic" full backup and attendant complexity of a cloud-facing appliance, which might otherwise arise if LUN snapshots don't share blocks in the cloud. A synthetic backup is the ability to create a new baseline from the current baseline and one or many incrementals. The following are implications of not having a synthetic backup or equivalent functionality in a cloud backup solution:

1) no opportunities to scavenge obsolete/old data from the cloud, and/or
  2) need to transfer a new baseline which can take a long time and induce unnecessary cost A disclosed technique instead uses a Volume to Object (VTO) translation to upload LUN baselines and incrementals/deltas to the cloud. A VTO operating layer, provided for example by a cloud appliance, provides the following capabilities/features:

1) Volume to object translation, enabling a volume to be presented over block protocols
  2) Crash consistent volume semantic, making it suitable for hosting a crash consistent file system image
  3) Volume snapshot in the cloud with a baseline volume and its snapshots sharing blocks, making efficient use of cloud storage resources while also enabling direct access to any cloud-stored version of a LUN directly without requiring synthetic full backup or analogous construction processes More particularly, a computer-implemented method is disclosed of shipping local snapshots of logical units of data storage (LUNs) to cloud storage, the local snapshots residing on local physical storage of a data storage system. The method includes replicating a baseline local snapshot of a LUN to a cloud-backed LUN backed by cloud physical storage of a separate cloud storage system, and upon completion of the replicating, taking a first snapshot of the cloud-backed LUN to establish a baseline cloud-backed snapshot backed by the cloud physical storage. The method further includes, for a subsequent local snapshot of the LUN, (1) identifying data content differences between the subsequent local snapshot and the baseline local snapshot, (2) updating the cloud-backed LUN by applying the data content differences thereto, and (3) taking a second snapshot of the cloud-backed LUN, the second snapshot being a cloud-backed copy of the subsequent local snapshot and containing, in the cloud physical storage, (a) first blocks unique to the second snapshot and (b) second blocks shared with the baseline cloud-backed snapshot.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
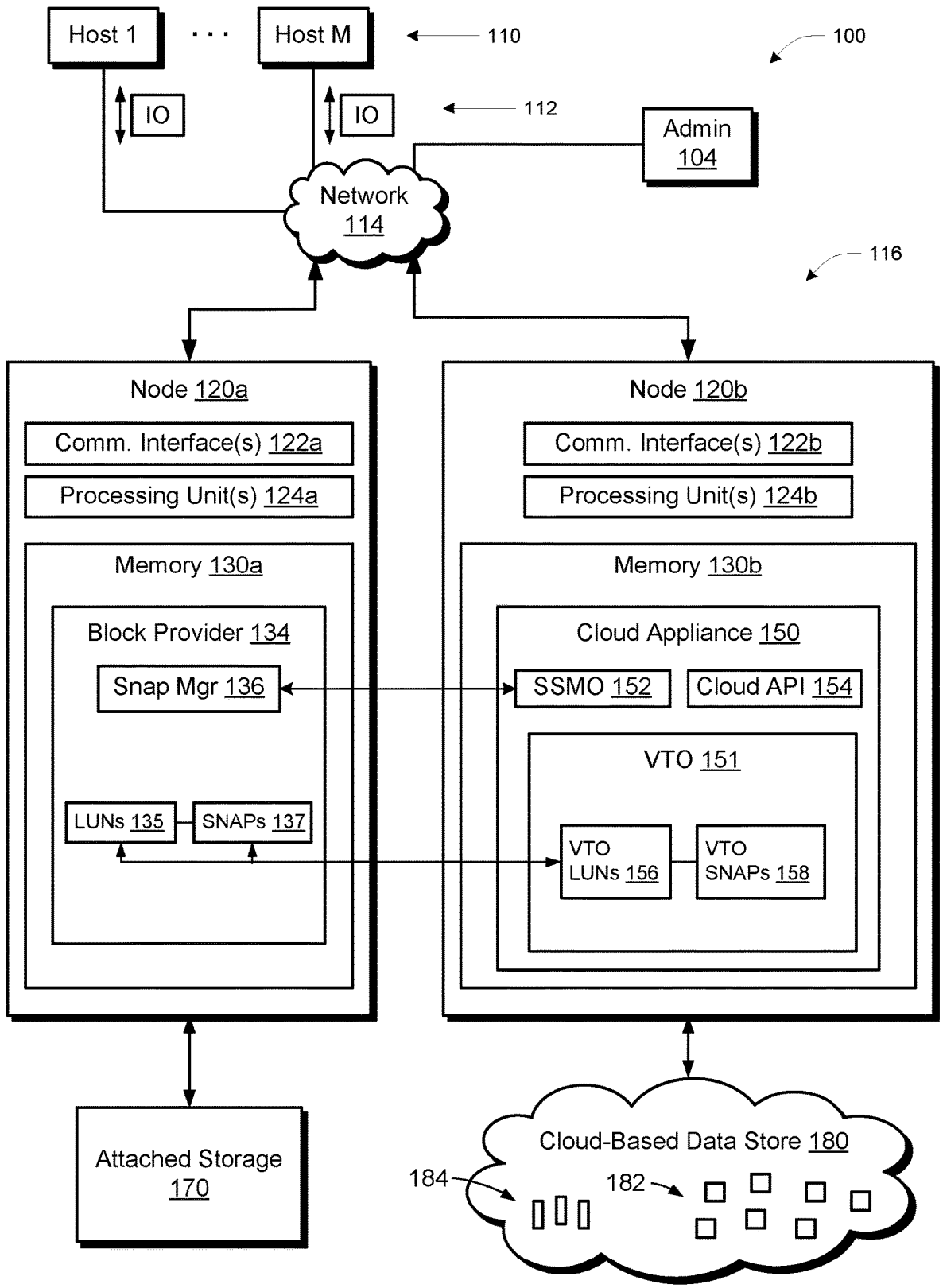
FIG. 1 is a block diagram of a data storage system.

FIG. 1 shows an example environment 100 in which embodiments of the improved technique hereof can be practiced. Here, multiple host computing devices ("hosts") 110 access a data storage system 116 over a network 114. An administrative machine 104 may also connect to the data storage system 116 over the network 114. The data storage system 116 may include any number of computing nodes, with two nodes 120a and 120b specifically shown. The first node 120a is configured to process host I/O requests 112, such as read requests and write requests, and is coupled to attached storage 170, such as one or more magnetic disk drives, solid-state drives, and the like. In an example, the first node 120a is connected to the attached storage 170 using cables or via a SAN (storage area network). The second node 120b is configured to access cloud storage and is coupled to a cloud-based data store 180, e.g., over a WAN (wide area network), such as the Internet. The cloud-based data store 180 may be part of a public cloud or a private cloud and may be provided by any suitable platform, such as Amazon Cloud Services (ACS), Microsoft Azure, Dell EMC Elastic Cloud Services (ECS), and the like. In an example, the cloud-based data store 180 stores data in the form of objects 182 and supports the storage of searchable metadata elements 184. For example, the cloud-based data store 180 supports the storage of searchable blobs in which the searchable metadata elements 184 may be provided. However, the invention hereof is not limited to object-based data or to data stores that provide blobs. As generally known, the objects 182 are user-defined units of data, each having a size as well as a unique identity. The relationship of objects 182 to internal data structures of the data storage system 116, such as volumes, LUNs, blocks, etc. is defined by the data storage system 116, and in particular by a volume-to-object (VTO) translator 151 described more below.

Each of the nodes 120a and 120b includes a set of communication interfaces (122a or 122b), such as one or more network interface adapters for converting electronic and/or optical signals received over the network 114 to electronic form for use by the respective node. Each of the nodes 120a and 120b further includes a set of processing units (124a or 124b) and memory (130a or 130b). Each set of processing units 124a and 124b includes one or more processing chips and/or assemblies. In a particular example, each set of processing units includes numerous multi-core CPUs. Each of the memories 130a and 130b includes both volatile memory (e.g., RAM), and non-volatile memory, such as one or more ROMs, disk drives, solid state drives, and the like. In each node 120, the set of processing units and the memory together form control circuitry, which is constructed and arranged to carry out various methods and functions as described herein. Each of the memories 130a and 130b includes a variety of software constructs realized in the form of executable instructions. When the executable instructions are run by the respective set of processing units 124a or 124b, the set of processing units are made to carry out the operations defined by the software constructs. Although certain software constructs are specifically shown and described, it is understood that each memory typically includes many other software constructs, which are not shown, such as various applications, processes, and daemons. Further, one should appreciate that the use of two nodes 120a and 120b is merely illustrative, as the data storage system 116 may include any number of nodes, including a single node.

As further shown in FIG. 1, the memory 130a of node 120a "includes," i.e., realizes by execution of software instructions, a block provider 134 including a snapshot manager (Snap Mgr) 136. The block provider 134 maintains logical units of storage (LUNs) 135 and makes them available to the hosts 110 for secondary data storage. The snap manager 136 provides for taking point-in-time copies of LUNs 135, referred to as "snapshots" or "snaps" 137, for use in any of a variety of ways including backup/restore and checkpointing. The LUNs 135 and snaps 137 are "locally backed", i.e., utilize the attached storage 170 for underlying physical storage for the LUNs 135 and snaps 137, as distinct from "cloud-backed" elements that utilize the cloud-based data store 180 as described more below. Further structure and operation of the block provider 134 is provided below. The memory 130a may include any number of such block providers 134.

Although not shown in FIG. 1, the data storage system 116 may also include one or more additional nodes functioning as network attached storage (NAS) nodes, which may themselves be clients of the block provider 134 utilizing block storage provided thereby. As generally known, a NAS node serves as a network-based extension of a host-based file system and utilizes a file-system access protocol in communicating with the hosts 110 via the network 114. Examples of such protocols include Common Internet File System (CIFS) and Server Messaging Block (SMB). Such a NAS node may be loosely coupled to the block provider 134 (e.g., via network 114) or much more tightly coupled, e.g., by physical memory of a single compute server hosting both the NAS node and block provider 134 as respective virtual machines.

The memory 130b of node 120b includes a cloud appliance 150 that further includes a volume-to-object (VTO) translator 151 (also referred to herein as VTO 151), a snapshot-shipping maintenance & orchestration (SSMO) unit 152, and one or more cloud APIs (application program interfaces) 154, for managing communications with the cloud-based data store 180. The VTO translator 151 is configured to compose block-based volumes from respective sets of objects 182 in the data store 180. Example block-based volumes are shown as VTO LUNs 156 and VTO Snaps 158, analogous to the local LUNs 135 and snaps 137 of the block provider 134. In operation, the VTO 151 may associate a first volume with a first set of the objects 182 and a second volume with a second set of the objects 182. The VTO 151 is further configured to support object sharing among volumes, such that the same object 182 may be part of multiple volumes, e.g., if the corresponding data across the volumes are identical. The VTO 151 is still further configured to support snapshot operations. For instance, the VTO 151 may generate a snapshot of a volume as a point-in-time version of that volume. Owing to the object sharing, the volume and its snapshot may share most if not all of the objects that support them. Additionally, objects are generally shared among multiple distinct snapshots of the same volume. The VTO translator 151 preferably stores mapping structures for organizing data of volumes in objects 182, as well as the data itself. A suitable VTO translator that includes these features is commercially available from Dell EMC of Hopkinton, Mass., as part of the CloudArray appliance.

The cloud appliance 150 is configured to query the data store 180 based on searchable metadata elements 184. For example, the VTO translator 151 associates each of the searchable metadata elements 184 with a corresponding volume. For instance, a different searchable metadata element 184 may be provided for each volume managed by the VTO translator 151. As described below, the searchable metadata elements 184 include information that identifies LUNs and versions thereof with which particular VTO volumes are associated.

In example operation, node 120a in the data storage system 116 receives I/O requests 112 from hosts 110 (or from a separate NAS node, as mentioned above). The I/O requests 112 include read requests and/or write requests directed to the LUNs 135 (and in some cases, to the snaps 137). The block provider 134 satisfies the requests by accessing the underlying physical storage. For active, non-archived ("production") LUNs 135, this means accessing the local attached storage 170. In other cases, it may be necessary to access other physical storage, such as the cloud-based data store 180 via the cloud appliance 150. Typically, the block provider 134 implements some type of caching to decouple individual reads and writes from the attached storage 170, as generally known in the art.

The connections between the block provider 134 and the cloud appliance 150 include both a data transfer channel as well as a control channel. The data transfer channel preferably employs a block storage protocol such as iSCSI, and this particular example is assumed in the remaining description. The control channel is structured for more general-purpose communications such as exchanging out-of-band requests and corresponding responses. The control channel may employ an interface using so-called RESTful techniques, where REST refers to "representational state transfer" as generally known in the art. As with the connections to a separate NAS node as described above, the block provider 134 and cloud appliance 150 may be loosely coupled, e.g., over an external network 114, or they may be much more tightly coupled such as within a single VM server computer.

Figure 2:
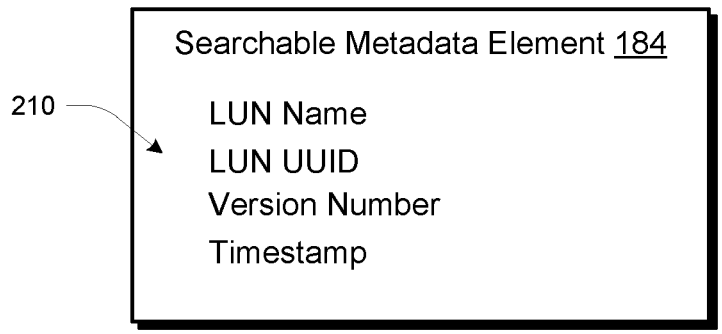
FIG. 2 is a schematic diagram of metadata.

FIG. 2 shows example information 210 that the VTO translator 151 may store in a searchable metadata element 184. The information 210 may be stored as different fields or in any suitable way, which may depend upon the features provided by the particular type of cloud-based data store 180 being used. In an example, a different searchable metadata element 184 is created for each snapshot generated pursuant to a group snapshot operation. In a non-limiting example, each searchable metadata element 184 includes the following information:

- LUN Name. The name of the production LUN 135 associated with this volume (VTO LUN 156 or VTO Snap 158).
- LUN UUID. A universally unique identifier of the LUN.
- Version Number. A number that is incremented with each snapshot operation and indicates a version number of the LUN.
- Timestamp. A time and date when the snapshot operation producing this snapshot was performed.

Some of the information 210 in the searchable metadata element 184 may be provided for operational convenience rather than out of necessity. Information may be helpful during restore operations and/or for supporting various types of queries. For example, administrators may query searchable metadata elements 184 based on any of the information 210. Querying based on Timestamp, for example, allows administrators to restore to a particular point in time, such as before a known corruption event. The VTO translator 151 may associate searchable metadata elements 184 with respective snapshots in a variety of ways, such as in mapping metadata in the data store 180, in predefined storage regions, or in any suitable manner.

Figure 3:
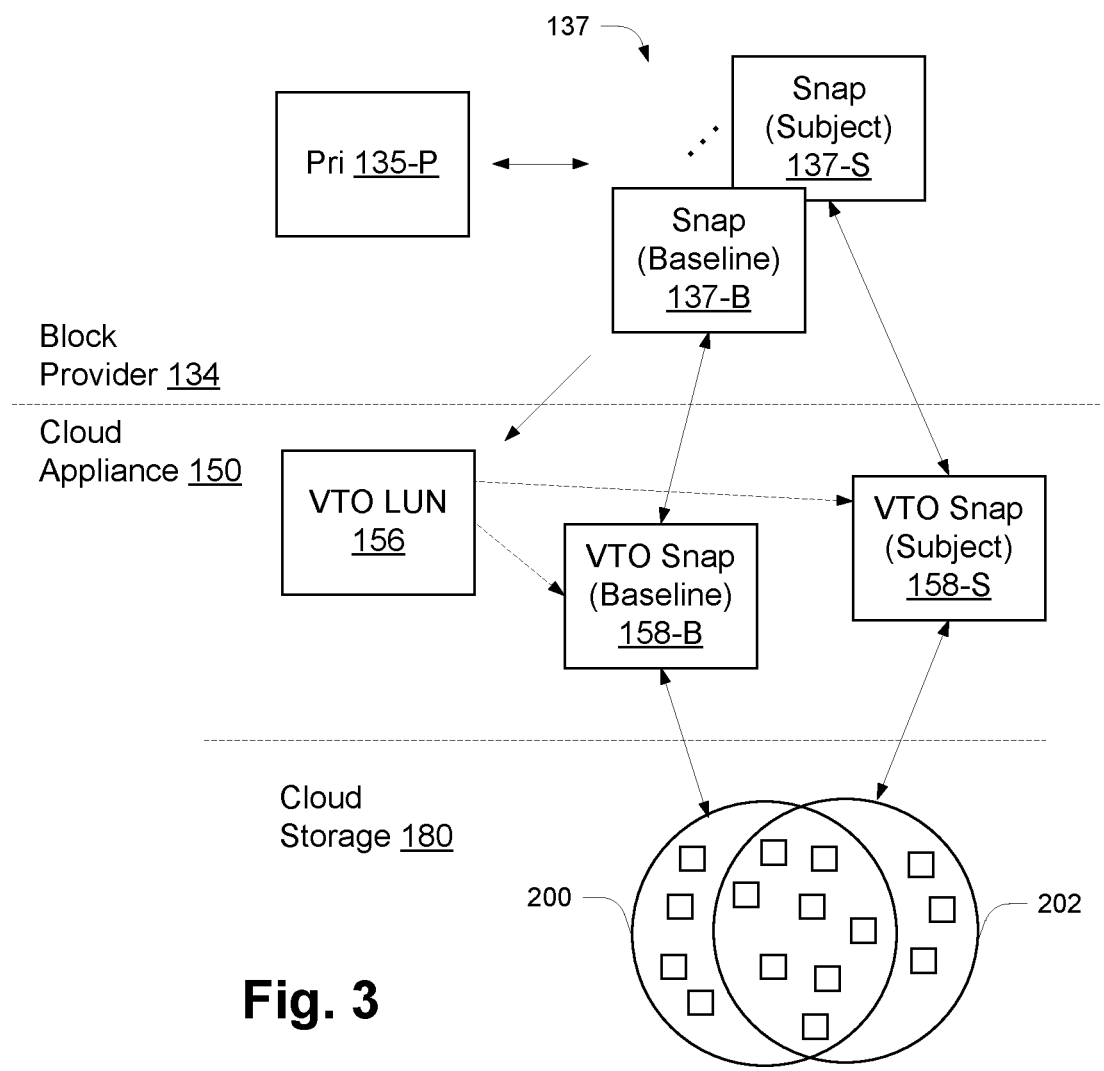
FIG. 3 is a schematic diagram of relationships among various local and cloud-backed storage elements (LUNs and snapshots ("snaps"))

FIG. 3 shows more detailed aspects of the block provider 134 and cloud appliance 150 as they relate to creating cloud-based backups of snapshots 137, referred to herein as "snapshot shipping". A primary LUN 135-P has associated local snapshots 137, specifically including two shown as a baseline snap 137-B and a "subject" snap 137-S, where "subject" refers to the snap 137-S being the subject of a snapshot shipping operation. The cloud appliance 150 has a corresponding VTO LUN 156 and corresponding VTO Snaps 158 shown as a baseline VTO Snap 156-B and a subject VTO Snap 158-S. The baseline VTO Snap 156-B is backed by a first set 200 of cloud objects 182, and the subject VTO Snap 158-S is backed by a second set 202 of cloud objects 182, with some degree of object sharing as indicated by the overlapping circles. FIG. 3 shows the situation after the subject snap 137-S has been "shipped", i.e., backed up to the cloud-based data stored 180 via the cloud appliance 150, according to a process described below. While the VTO Snaps 158 are generally static once created, the VTO LUN 156 is somewhat more dynamic, being updated periodically in connection with snapshot shipping as described more below. Although not shown in FIG. 3, the VTO LUN 156 is also backed by corresponding cloud objects 182 of cloud storage 180, many of which may be shared with VTO Snaps 158. This backing is omitted from FIG. 3 for clarity.

Further regarding the cloud-based data store 180, the cloud-backed baseline VTO Snap 158-B and the subject VTO Snap 158-S share many of the same objects 182, such that duplication of data storage is avoided. Here, VTO translator 151 maintains the sharing relationships, which may be persisted in mapping metadata within the data store 180. The sharing scheme provided by VTO translator 151 not only reduces the amount of cloud storage required to back different versions of a volume, but it also efficiently supports common backup procedures that employ regular "full" backups mixed in with more frequent partial (incremental) backups. Generally, performing full backups to cloud storage incurs considerable cost and performance penalty, especially in modern data storage systems with their extremely large LUNs (GB to TB in size, for example). One alternative is to use so-called "synthetic" full backup, in which a logically unitary full backup is created by synthesizing it from a series of prior incremental backups and some earlier true full backup. Such a scheme requires complicated logic within a cloud appliance. In contrast, using the volume-to-object functionality of the VTO translator 151, each snapshot that is shipped is independently maintained as logically a "full" snapshot, usable by itself to restore a production LUN 135 to an earlier state without reference to a preceding "full backup". Thus the complication of synthetic full backup and restore are avoided.

Figure 4:
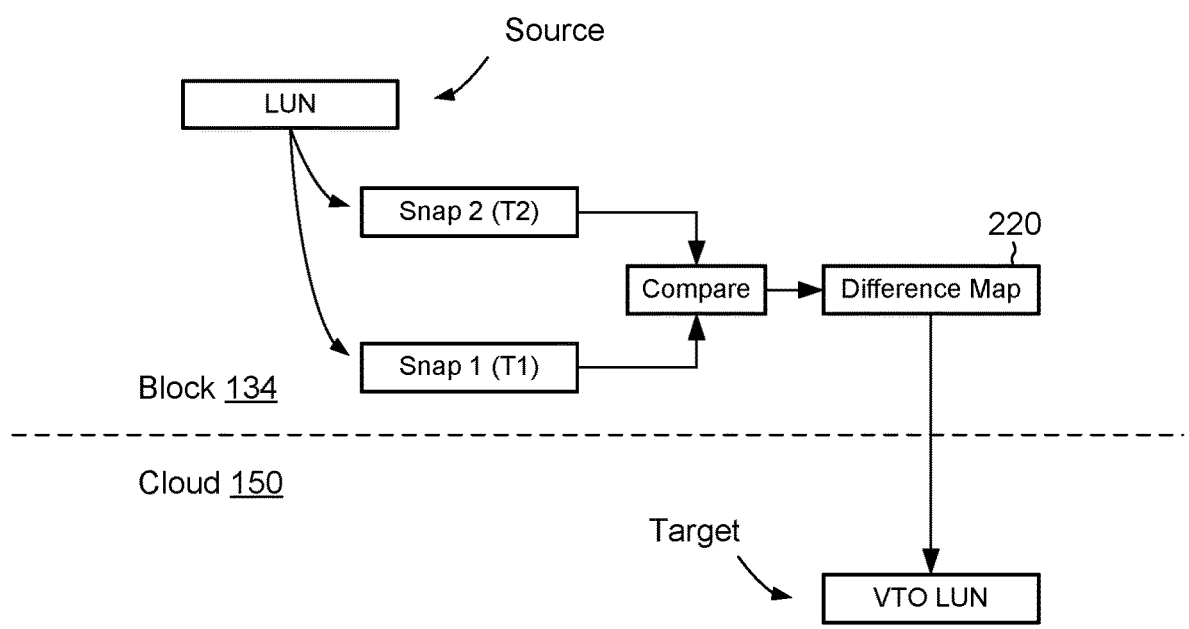
FIG. 4 is a schematic diagram of a snap difference (snap diff) operation.

FIG. 4 illustrates a snap difference ("snap diff") operation used in the snapshot shipping process to identify data content differences between two snapshots. It is assumed that two snaps of a source LUN exist, shown as Snap 1 (taken at time T1) and Snap 2 (taken at later time T2). The snap diff operation is performed at the block provider 134, by comparing the data contents of the two snaps and creating a difference map 220, which identifies differences between Snap 1 and Snap 2 and thus reflects changes in the source LUN between times T1 and T2. Specifically, the difference map 220 identifies (1) all data blocks of Snap 2 that represent additions or modifications over contents of Snap 1, and (2) all data blocks that represent deallocations or deletions over contents of Snap 1. The block provider 134 sends the difference map 220 to the cloud appliance 150, where the difference map 220 is used to update a target VTO LUN, as described further below. Once this has been done, the target VTO LUN is current with the source LUN as of time T2.

Figure 5:
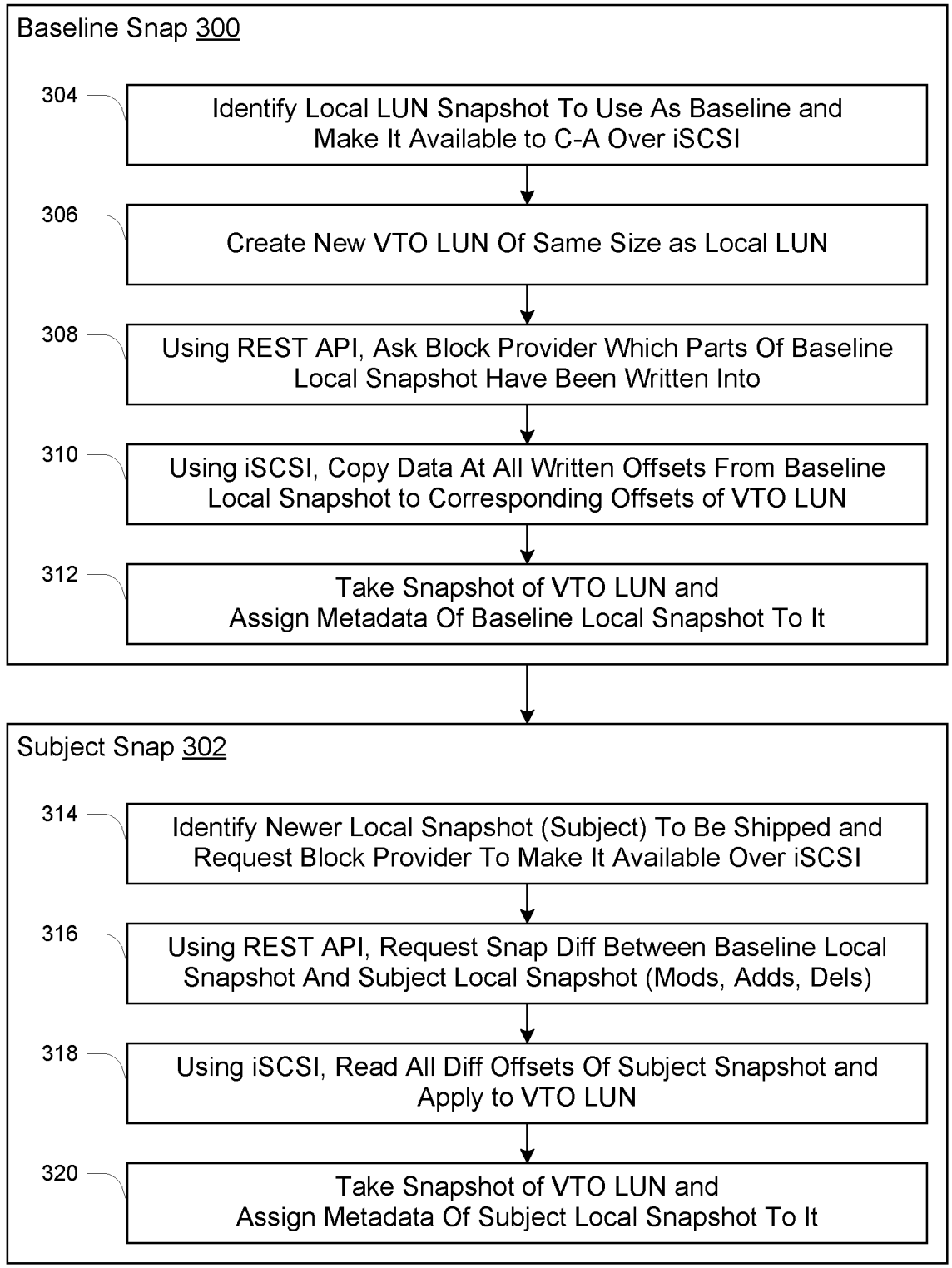
FIG. 5 is a flow diagram for a snapshot shipping operation.

FIG. 5 illustrates a snapshot shipping process. The process is initiated and primarily controlled by action of the SSMO 152 of the cloud appliance 150. In alternative embodiments, initiation and/or control may involve other actors, including for example the block provider 134 and/or an external agent such as the admin 104.

The process is divided into two groups of operations. First operations are shown as baseline snap operations 300, which are used to establish the baseline VTO LUN 156-B. Second operations are shown as subject snap operations 302, used to establish the subject VTO snap 158-S.

In the baseline snap operations 300, at 304 the system identifies a local LUN snapshot to use as the baseline 137-B and it is made available to the cloud appliance 150 over the iSCSI connection.

At 306, the cloud appliance 150 creates a new VTO LUN 156 of the same size as the baseline snap 137-B to use for baseline.

At 308, the cloud appliance 150 requests (using REST API) that the block provider 134 identify the parts of the baseline snap 137-B that have been written into.

At 310, the cloud appliance 150 performs a copy operation, reading (using iSCSI) all the different offsets of the baseline snap 137-B that have been written into and writing the data at the corresponding offsets into the VTO LUN 156.

At 312, when the copy of step 310 is complete, the cloud appliance 150 takes a snapshot of the VTO LUN 156 and identifies this snapshot as the baseline VTO Snap 158-B. The metadata (name, timestamp, etc.) of the baseline snapshot 137-B is assigned to this snapshot.

Subsequently, the subject snap operations 302 are performed for the subject snap 137-S. As noted previously, the timing of snapshot shipping as well as the selection of snapshots to be shipped may be done by any of several actors, and typically in accordance with some established policy.

At 314, the cloud appliance 150 requests the block provider 134 to make the subject snapshot 137-S available over iSCSI.

At 316, the cloud appliance 150 requests over REST API the snap diff between the subject snapshot 137-S and the baseline snapshot 137-B. The snap diff operation is described above with reference to FIG. 4.

At 318, the cloud appliance 150 reads (using iSCSI) all the different offsets of the subject snap 173-S that have been written into and writes the data at the corresponding offset into the VTO LUN 156. This operation includes deallocations and deletions, as mentioned above.

At 320, when the copy from the subject snapshot 137-S to the VTO LUN 156 is complete, the cloud appliance 150 takes a snapshot of the VTO LUN 156 and identifies it as the subject VTO Snap 158-S. The metadata (name, timestamp, etc. . . . ) of the subject snap 137-S is assigned to it.

The subject snap operations 302 can be iterated for subsequent (newer) snaps when they are to be shipped. A given iteration will use an associated baseline VTO snap 158-B corresponding to the baseline snap 137-B to which the subject snap is referenced. New baselines may be taken at any time, by execution of the baseline snap operations 300. The conditions for doing so may be defined by policy, and may be automated. As an example, a new baseline may be taken after some predetermined number of subsequent non-baselines have been created, or when the size indicated by snap diff exceeds some threshold. Other conditions may of course be used.

Figure 6:
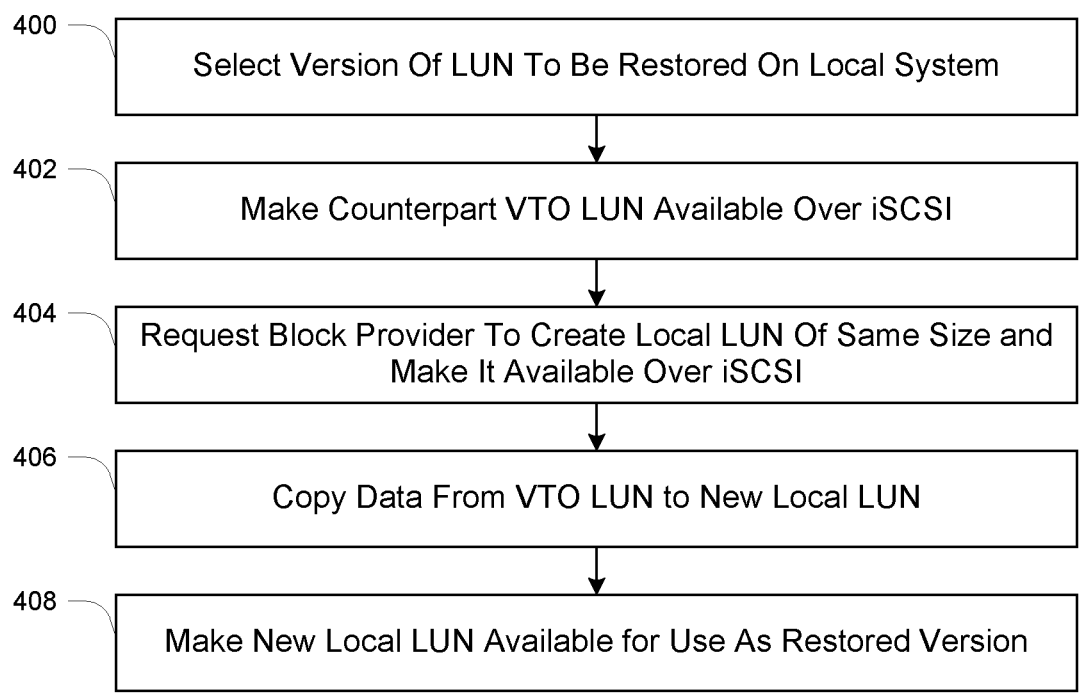
FIG. 6 is a flow diagram for a snapshot restoring operation.

FIG. 6 illustrates operations of restore process or workflow, which accesses a stored cloud-backed VTO snap 158 to restore a corresponding version of a production LUN 135. This process may be used to return to an earlier operating state for any of a variety of reasons, including for example restarting operation after a crash or other failure.

In the restore process, at 400 the LUN version to be restored is selected or identified in some manner, which again may be done by any of different actors in different embodiments. For example, this may be done partly through action of the administrator 104 who is orchestrating a recovery operation.

At 402, the cloud appliance 150 makes the corresponding cloud-backed VTO snap 158 available over iSCSI. In this operation, the metadata 184 identifying this snap 158 as corresponding to a particular production LUN 135 and version may be utilized.

At 404, the cloud appliance 150 requests the block provider 134 to create a local LUN of the same size as the VTO snap 158 being restore from and to make this local LUN available over iSCSI.

At 406, the cloud appliance 150 reads the VTO Snap 158 and copies its data to the newly created LUN at the corresponding offsets. Any deallocated blocks are skipped.

At 408, once the copy is complete, the desired LUN version has been restored on the local system, and can be made available for use (servicing IOs).

While various embodiments of the invention have been particularly shown and described, it will be understood by those skilled in the art that various changes in form and details may be made therein without departing from the scope of the invention as defined by the appended claims.

What is claimed is:

1. A method of shipping local snapshots of logical units of data storage (LUNs) to cloud storage, the local snapshots residing on local physical storage of a data storage system, comprising:

replicating a baseline local snapshot of a LUN to a cloud-backed LUN backed by cloud physical storage of a separate cloud storage system, and upon completion of the replicating, taking a first snapshot of the cloud-backed LUN to establish a baseline cloud-backed snapshot backed by the cloud physical storage; and for a subsequent local snapshot of the LUN, (1) identifying data content differences between the subsequent local snapshot and the baseline local snapshot, (2) updating the cloud-backed LUN by applying the data content differences thereto, and (3) taking a second snapshot of the cloud-backed LUN, the second snapshot being a cloud-backed copy of the subsequent local snapshot and containing, in the cloud physical storage, (a) first objects unique to the second snapshot and (b) second objects shared with the baseline cloud-backed snapshot, wherein the data storage system includes a block provider providing host computer access to the LUNs and a cloud appliance providing access to the cloud storage system, the cloud appliance including a volume-to-object translator providing the cloud-backed LUN and cloud-backed snapshots using respective logical mappings to corresponding sets of objects, and wherein the method further including maintaining connections between the block provider and the cloud appliance including a data transfer channel and a control channel, the data transfer channel employing a block storage protocol, the control channel being structured for more general-purpose communications including exchanging out-of-band requests and corresponding responses.

2. The method of claim 1, wherein the cloud storage system supports storage of searchable metadata elements usable to associate cloud-backed LUNs with corresponding LUNs of the data storage system.

3. The method of claim 2, wherein each searchable metadata element for a respective cloud-backed snapshot includes a LUN name, a LUN identifier, a version number, and a timestamp, the LUN name being a name of a LUN corresponding to the cloud-backed snapshot, the LUN identifier being an identifier of the LUN, the version number being a number incremented with each snapshot operation and indicating a version of the LUN, and the timestamp including a date and time when a snapshot operation producing the cloud-backed snapshot was performed.

4. The method of claim 1, wherein the cloud appliance further includes a snapshot-shipping maintenance and orchestration unit (SSMO) and one or more cloud application program interfaces (APIs), the SSMO initiating and controlling the shipping of the local snapshots, the cloud APIs managing communications with the cloud storage system.

5. The method of claim 1, wherein the data transfer channel is an iSCSI channel, and the control channel utilizes a representation state transfer (REST) interface.

6. The method of claim 1, wherein the block provider and cloud appliance are included in respective virtual machines of a single server computer.

7. The method of claim 1, wherein identifying the data content differences includes using a snap difference operation comparing data contents of the baseline local snapshot to the subsequent local snapshot to generate a difference map, the difference map identifying (1) all data blocks of the subsequent local snapshot that represent additions or modifications over contents of the baseline snapshot, and (2) all data blocks that represent deallocations or deletions from the baseline local snapshot.

8. The method of claim 1, further including steps of a snapshot restore process by which a version of the local LUN is restored from the cloud storage system, the steps including:
   making a cloud-backed snapshot available for copying to the data storage system the cloud-backed snapshot corresponding to the version of the local LUN being restored;
   creating a new local LUN of the same size as the cloud-backed snapshot and making the new local LUN available for the copying;
   copying data of the cloud-backed snapshot to the new local LUN; and
   upon completion of the copying, making the new local LUN available for servicing host IOs.

9. The method of claim 1, wherein the block provider and cloud appliance are loosely coupled via an external network.

10. The method of claim 1, wherein the data storage system includes one or more additional nodes functioning as network attached storage (NAS) nodes, the NAS nodes being clients of the block provider and utilizing block storage provided thereby.

11. A data storage system having local physical storage, a computer-implemented block provider, and a computer-implemented cloud appliance, the block provider storing local snapshots of logical units of data storage (LUNs) on the local physical storage, the block provider and cloud appliance being co-operative to ship the local snapshots to cloud storage by:
   replicating a baseline local snapshot of a LUN to a cloud-backed LUN backed by cloud physical storage of a separate cloud storage system, and upon completion of the replicating, taking a first snapshot of the cloud-backed LUN to establish a baseline cloud-backed snapshot backed by the cloud physical storage; and
   for a subsequent local snapshot of the LUN, (1) identifying data content differences between the subsequent local snapshot and the baseline local snapshot, (2) updating the cloud-backed LUN by applying the data content differences thereto, and (3) taking a second snapshot of the cloud-backed LUN, the second snapshot being a cloud-backed copy of the subsequent local snapshot and containing, in the cloud physical storage, (a) first objects unique to the second snapshot and (b) second objects shared with the baseline cloud-backed snapshot,
   wherein the cloud appliance includes a volume-to-object translator providing the cloud-backed LUN and cloud-backed snapshots using respective logical mappings to corresponding sets of objects,
   and wherein the data storage system further includes a data transfer channel and a control channel between the block provider and the cloud appliance, the data transfer channel employing a block storage protocol, the control channel being structured for more general-purpose communications including exchanging out-of-band requests and corresponding responses.

12. The data storage system of claim 11, wherein the cloud storage system supports storage of searchable metadata elements usable to associate cloud-backed LUNs with corresponding LUNs of the data storage system.

13. The data storage system of claim 12, wherein each searchable metadata element for a respective cloud-backed snapshot includes a LUN name, a LUN identifier, a version number, and a timestamp, the LUN name being a name of a LUN corresponding to the cloud-backed snapshot, the LUN identifier being an identifier of the LUN, the version number being a number incremented with each snapshot operation and indicating a version number of the LUN, and the timestamp including a date and time when a snapshot operation producing the cloud-backed snapshot was performed.

14. The data storage system of claim 11, wherein the cloud appliance further includes a snapshot-shipping maintenance and orchestration unit (SSMO) and one or more cloud application program interfaces (APIs), the SSMO initiating and controlling the shipping of the local snapshots, the cloud APIs managing communications with the cloud storage system.

15. The data storage system of claim 11, wherein the data transfer channel is an iSCSI channel, and the control channel utilizes a representation state transfer (REST) interface.

16. The data storage system of claim 11, wherein the block provider and cloud appliance are included in respective virtual machines of a single server computer.

17. The data storage system of claim 11, wherein identifying the data content differences includes using a snap difference operation comparing data contents of the baseline local snapshot to the subsequent local snapshot to generate a difference map, the difference map identifying (1) all data blocks of the subsequent local snapshot that represent additions or modifications over contents of the baseline snapshot, and (2) all data blocks that represent deallocations or deletions from the baseline local snapshot.

18. The data storage system of claim 11, wherein the block provider and cloud appliance are further co-operative to perform a snapshot restore process by which a version of the local LUN is restored from the cloud storage system, the snapshot restore process including:
   making a cloud-backed snapshot available for copying to the data storage system the cloud-backed snapshot corresponding to the version of the local LUN being restored;
   creating a new local LUN of the same size as the cloud-backed snapshot and making the new local LUN available for the copying;
   copying data of the cloud-backed snapshot to the new local LUN; and
   upon completion of the copying, making the new local LUN available for servicing host IOs.

19. The data storage system of claim 11, wherein the block provider and cloud appliance are loosely coupled via an external network.

20. The data storage system of claim 11, further including one or more additional nodes functioning as network attached storage (NAS) nodes, the NAS nodes being clients of the block provider and utilizing block storage provided thereby.

* * * * *